United States Patent
Natanzon et al.

(10) Patent No.: US 10,893,296 B2
(45) Date of Patent: Jan. 12, 2021

(54) SENSOR DATA COMPRESSION IN A MULTI-SENSOR INTERNET OF THINGS ENVIRONMENT

(71) Applicant: EMC IP Holding Company LLC, Hopkinton, MA (US)

(72) Inventors: Assaf Natanzon, Tel Aviv (IL); Amihai Savir, Sansana (IL); Oshry Ben-Harush, Kibbutz Galon (IL); Anat Parush Tzur, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/171,560

(22) Filed: Oct. 26, 2018

(65) Prior Publication Data

US 2020/0137420 A1    Apr. 30, 2020

(51) Int. Cl.
| | | |
|---|---|---|
| H04N 19/625 | (2014.01) | |
| H04N 19/61 | (2014.01) | |
| G06N 3/04 | (2006.01) | |
| G06F 17/14 | (2006.01) | |

(52) U.S. Cl.
CPC ......... *H04N 19/625* (2014.11); *G06F 17/147* (2013.01); *G06N 3/0445* (2013.01); *G06N 3/0454* (2013.01); *H04N 19/61* (2014.11)

(58) Field of Classification Search
CPC .... H04N 19/625; H04N 19/61; G06F 17/147; G06N 3/0454; G06N 3/0445
See application file for complete search history.

(56) References Cited

U.S. PATENT DOCUMENTS

| | | | |
|---|---|---|---|
| 2017/0078706 A1* | 3/2017 | Van Der Vleuten | ..... H04N 5/20 |
| 2018/0006888 A1* | 1/2018 | Vaughn | ............... H04L 41/0826 |
| 2018/0060691 A1* | 3/2018 | Bernal | ................. G06K 9/6256 |
| 2018/0241852 A1* | 8/2018 | Maluf | ..................... H03M 7/30 |
| 2019/0043201 A1* | 2/2019 | Strong | ............... G06K 9/00993 |

(Continued)

OTHER PUBLICATIONS

U.S. Appl. No. 16/024,757 entitled, "Data Reduction Techniques for a Multi-Sensor Internet of Things Environment", filed Jun. 30, 2018.

(Continued)

*Primary Examiner* — Tat C Chio
(74) *Attorney, Agent, or Firm* — Ryan, Mason & Lewis, LLP (57) ABSTRACT

Techniques are provided for sensor data compression in a multi-sensor Internet of Things environment. An exemplary method comprises obtaining sensor data from a plurality of sensors satisfying one or more of predefined sensor proximity criteria and predefined similar sensor type criteria; applying an image-based compression technique to the sensor data to generate compressed sensor data; and providing the compressed sensor data to a data center. The image-based compression technique comprises a discrete cosine transform technique, a video compression technique, and/or an auto-encoder deep learning technique that utilizes one or more over-fitted bidirectional recurrent convolutional neural networks. The sensor data is optionally normalized prior to being applied to the image-based compression technique.

20 Claims, 7 Drawing Sheets

(56) References Cited

U.S. PATENT DOCUMENTS

2019/0260830 A1* 8/2019 Karjee .................. H04L 12/66

OTHER PUBLICATIONS

U.S. Appl. No. 16/050,239 entitled, "Correction of Sensor Data in a Multi-Sensor Internet of Things Environment", filed Jul. 31, 2018.
Kin et al., "Video Compression Using Recurrent Convolutional Neural Networks", downloaded from cs231n.stanford.edu/reports/2017/pdfs/423.pdf on Oct. 18, 2018.

* cited by examiner

SENSOR DATA COMPRESSION IN A MULTI-SENSOR INTERNET OF THINGS ENVIRONMENT

FIELD

The field relates generally to the processing of sensor data.

BACKGROUND

An Internet of Things (IoT) network typically comprises distributed physical devices, such as vehicles and sensors, that exchange data over the network. With the proliferation of IoT networks, sensor data comprises information regarding a number of diverse physical variables. In an agricultural environment, for example, a sensor array may include a large number of sensors for a given agricultural field to monitor, for example, the temperature, humidity and/or rain levels across the field. The sensor data generated by a large number of such sensors with close geographical proximity, however, is often extensive, and comprised of similar sensor data that may not be informative.

A need therefore exists for improved techniques for compressing sensor data in a multi-sensor IoT environment.

SUMMARY

In one embodiment, a method comprises obtaining sensor data from a plurality of sensors satisfying one or more of predefined sensor proximity criteria and predefined similar sensor type criteria; applying, by at least one edge-based device, an image-based compression technique to the sensor data to generate compressed sensor data; and providing, by the at least one edge-based device, the compressed sensor data to a data center.

In some embodiments, the image-based compression technique comprises a discrete cosine transform technique, and the sensor data is optionally normalized prior to being applied to the discrete cosine transform technique. In another embodiment, the sensor data is obtained over time and the image-based compression technique comprises a video compression technique. In at least one embodiment, the image-based compression technique employs an auto-encoder deep learning technique that utilizes one or more over-fitted bidirectional recurrent convolutional neural networks to compress the sensor data obtained over time.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. Accordingly, the term "sensor" as used herein is intended to be broadly construed, so as to encompass, for example, sensors designed specifically for a specific purpose, such as thermometers, cameras and smoke detectors, as well as general-purpose devices, such as smartphones and tablets that perform a sensing function. One or more embodiments of the disclosure provide methods, apparatus and computer program products for compressing sensor data in a multi-sensor IoT environment.

In one or more embodiments, the disclosed sensor data compression techniques apply image-based compression techniques, such as discrete cosine transform techniques and/or video compression techniques, to the sensor data obtained from multiple sensors satisfying predefined sensor proximity criteria. Some embodiments optionally leverage multi-sensor information and optionally employ cross-sensor distributed algorithms to compress the sensor data from multiple sensors. In at least one embodiment, auto-encoder deep learning techniques are employed to compress the sensor data obtained over time.

In some embodiments, the disclosed sensor data compression techniques are based on a proximity between sensors, such as neighboring agricultural sensors. It has been found that sensors with close geographical proximity tend to create similar or even substantially identical sensor data. By creating localized dynamic distributed sensor networks, time, space and/or sensor type information among multiple sensors can be coordinated and thereby allow improved compression of sensor data.

In one or more embodiments, holistic sensor data compression policies are provided for compressing sensor data in a multi-sensor IoT system. The disclosed sensor data compression policies connect IoT components and their sensor data in a way that allows advanced sensor data compression techniques to be applied across a network of sensor devices within an IoT system. One or more aspects of the present disclosure recognize that complex IoT systems have sensor data compression needs, and the failure to address these needs may result in an inefficient use of storage and/or analytics resources, as well as degraded system performance or a loss of service.

Figure 1:
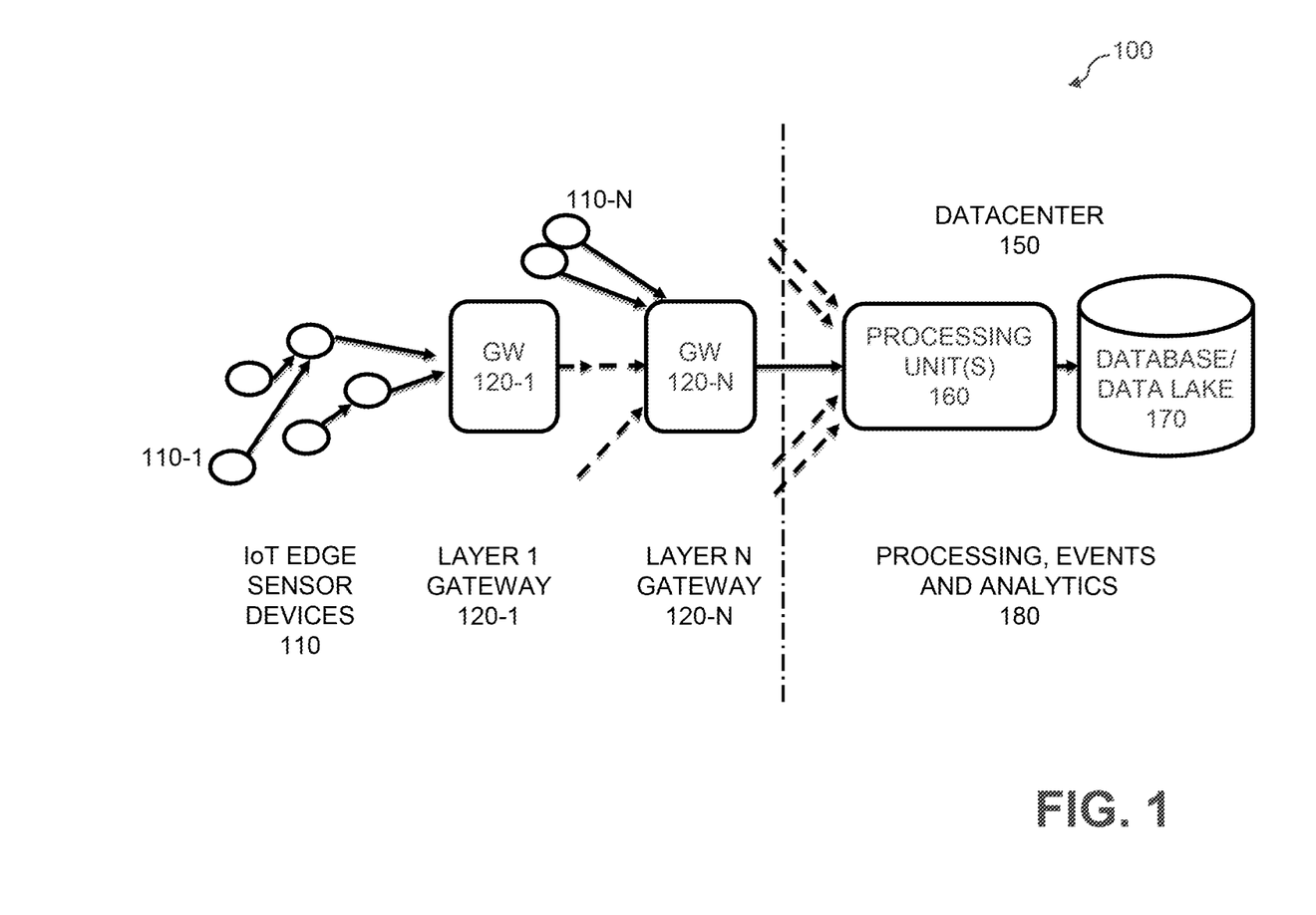
FIG. 1 illustrates an exemplary IoT system, according to one embodiment of the disclosure.

FIG. 1 illustrates an exemplary IoT system 100, according to one embodiment of the disclosure. Generally, IoT systems, such as the exemplary IoT system 100, typically consolidate edge devices to gateways and then to a central backend datacenter where most of the processing is done. There can be several layers of gateways. New edge devices are introduced and others retire constantly and the exemplary IoT system 100 needs to handle these topology changes.

As shown in FIG. 1, a plurality of IoT edge sensor devices 110-1 through 110-N (generally referred to herein as sensors 110) provide corresponding sensor readings to one or more layer 1 through layer N gateways 120-1 through 120-N. The IoT edge sensor devices 110-1 through 110-N comprise, for example, sensors, actuators and other devices that produce information or get commands to control the environment they are in. The gateways 120 comprise devices that consolidate communication and management of multiple IoT edge sensor devices 110. For example, a sensor array can be treated as a first gateway layer 110-1 to the multiple sensors that exist within the sensor array. In some embodiments, vehicles are connected to a regional edge layer (not explicitly shown in FIG. 1), where the region can be, for example, a cell of a cellular network. The regional gateways can be connected in some embodiments to Country clouds/gateways that are connected to a global cloud. It is noted that the IoT edge sensor devices 110, as well as the gateways 120 are considered edge-based devices in one or more embodiments.

One or more aspects of the present disclosure recognize that compression of the sensor data generated by multiple sensors of a sensor array, such as an array of agriculture sensors, can be improved using the disclosed multi-sensor compression techniques.

While gateways 120 are employed in the exemplary embodiment of FIG. 1, the gateways 120 are not mandatory. Gateways 120 are prevalent in numerous implementations, as networking capabilities of edge devices 110 are usually local in nature (e.g., power or connectivity) and the gateway 120 is used to connect to the Internet (not shown in FIG. 1).

The sensors 110 can be, for example, sensors designed for a specific purpose, such as thermometers, rain gauges and smoke detectors, as well as general-purpose sensor devices, such as, for example, smartphones and tablets that perform a sensing function, as would be apparent to a person of ordinary skill in the art. In one or more embodiments, the sensors 110 comprise the following public properties: unique identifier (ID), geo-location, and clock timestamp (ongoing).

The exemplary IoT system 100 of FIG. 1 further comprises a datacenter 150 comprising one or more processing unit(s) 160 and a database or data lake 170. The datacenter 150 performs one or more of processing, events and analytics functions 180, in a known manner.

While one or more exemplary embodiments are described herein using sensor devices 110 associated with an array of agriculture sensors, any sensors can be employed, as would be apparent to a person of ordinary skill in the art.

Figure 2:
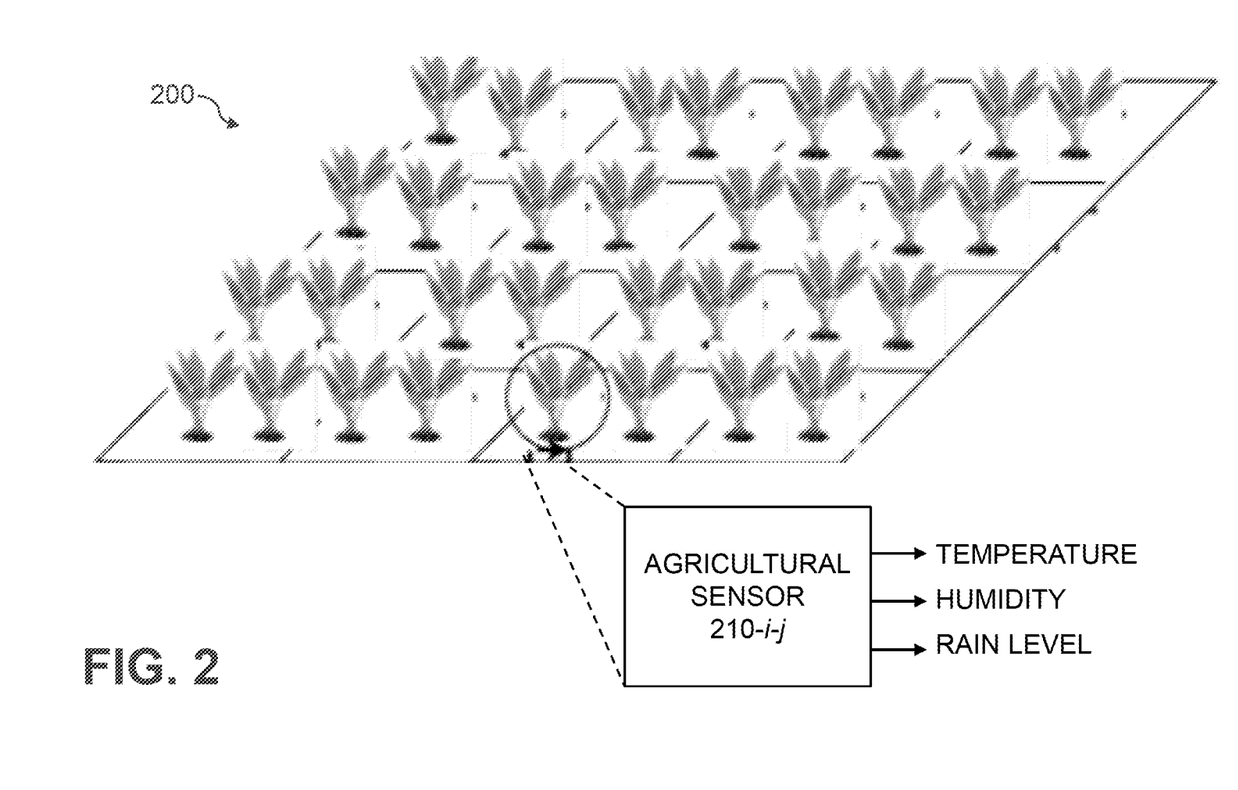
FIG. 2 illustrates an exemplary sensor array, according to an embodiment.

FIG. 2 illustrates an exemplary sensor array 200, according to an embodiment. In an exemplary agricultural environment, multiple sensors, such as an exemplary agricultural sensor 210-*i*-*j*, may be positioned in a sensor array 200, for example, with a semi-regular pattern or when the location of each sensor 210 in the sensor array 200 is otherwise known. In some agricultural environments, each plant may have an associated sensor 210. All of the sensors 210 in the array 200 optionally transmit the sensor data to the gateway 120, which transmits the data to the datacenter 150. In the example of FIG. 2, the exemplary agricultural sensor 210-*i*-*j* measures temperature, humidity and rain level.

In order to cover a large field in some agricultural domains, many sensors may be needed. A smart agricultural field, for example, may have a humidity sensor every meter. Thus, a field having a size of one square kilometer, for example, will have approximately one million sensors. The agricultural sensors are relatively cheap, on the order of cents per sensor. One problem with modeling and tracking IoT signals using machine learning approaches, for example, comes from the noise and robustness of the sensors, especially when a malfunctioning sensor generates wrong measurements. This affects the model accuracy especially when so many sensors are applied to the machine learning model.

Among other benefits, the disclosed techniques for compressing sensor data from multiple sensors can compensate for, or otherwise mitigate, the often redundant or substantially similar readings of multiple sensors.

While the exemplary sensor array 200 is illustrated in the context of an exemplary agricultural environment, other suitable multi sensor environments include sensors inside large datacenters with, for example, tens of thousands of servers, utilizing, for example, hundreds of thousands of sensors to measure, for example, temperature and humidity of each server as well as the overall datacenter environment. In addition, it is noted that a sensor array 200 comprised of sensors 210 in rows and columns is employed for ease of illustration, and such a regular pattern is not a requirement, as would be apparent to a person of ordinary skill in the art. Rather, the disclosed techniques for compressing sensor data can be employed in any multi-sensor environment where the location (or at least proximity) of the sensors is known.

Figure 3:
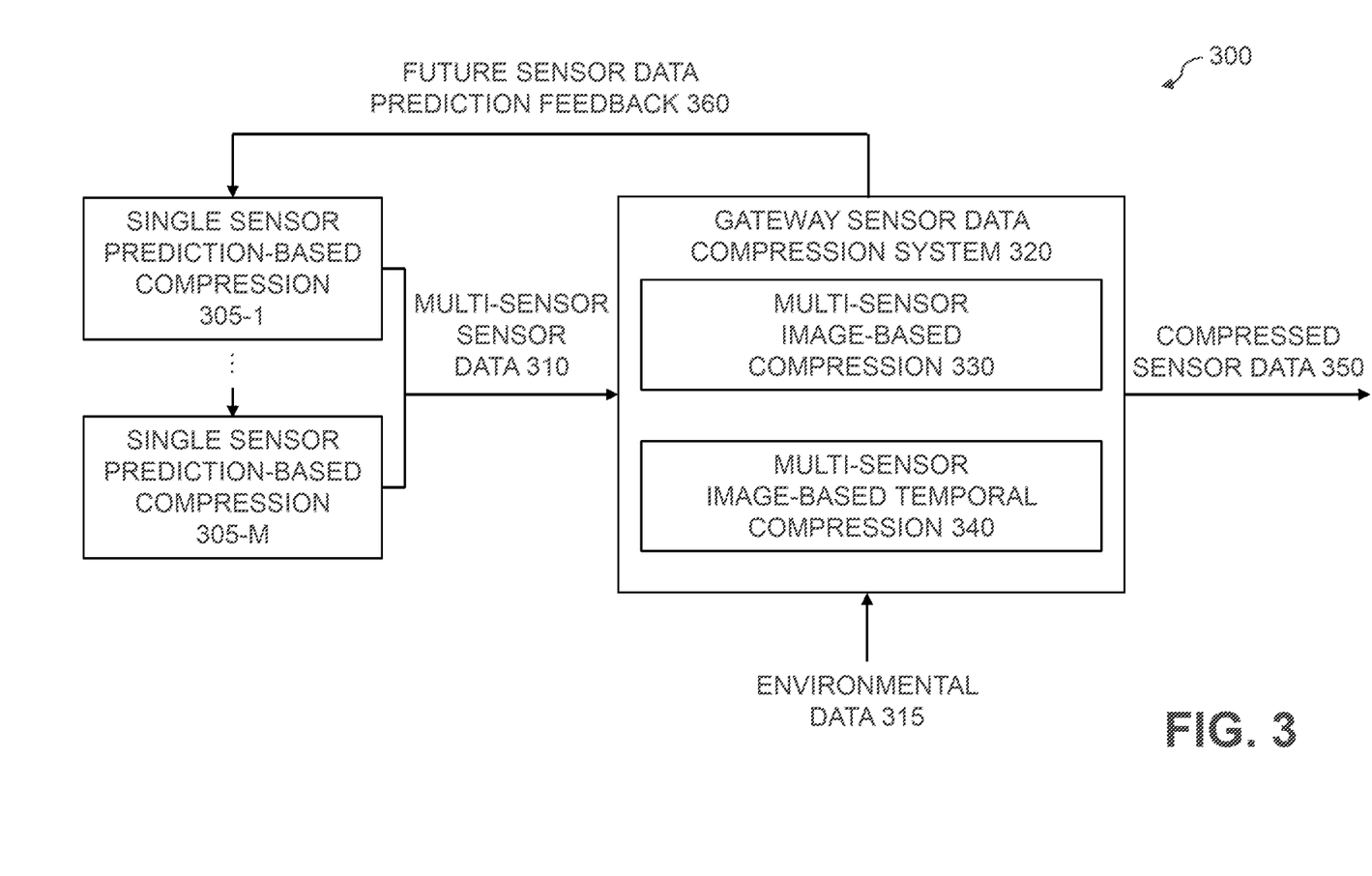
FIG. 3 illustrates an exemplary sensor data compression system for a multi-sensor IoT environment, according to some embodiments of the disclosure.

FIG. 3 illustrates an exemplary sensor data compression system 300 for a multi-sensor IoT environment, according to some embodiments of the disclosure. Generally, in one or more embodiments, the exemplary sensor data compression system 300 implements multiple levels of sensor data compression that will improve the utilization of bandwidth and other resources and save a significant amount of time and money. In this manner, the exemplary sensor data compression system 300 can compress sensor measurements that are substantially similar before they are applied to a machine learning model and/or an artificial intelligence model, for example, during a training period which may impair the efficiency and/or accuracy of the model(s).

As shown in FIG. 3, single sensor prediction-based compression 305-1 through 305-M is applied to the sensor data from individual sensors (for example, from a plurality of sensors 210 in the sensor array 200 of FIG. 2) to create multi-sensor sensor data 310. Generally, each sensor 110 transmits its data to the gateway 120. As noted above, measurements change continuously with little changes over time. Thus, the single sensor prediction-based compression 305 can apply a prediction algorithm to the sensor data from individual sensors 110 in order to send less data to the gateway 120. If a small amount of data loss is allowed, there is no need to send the substantially similar data values, if the predicted values are considered to be sufficient.

In some embodiments, the single sensor prediction-based compression 305 recognizes that as each sensor 210 transmits the sensor data to the gateway 120, the sensor measurements will change continuously but typically by only small amounts over time. The single sensor prediction-based compression 305 performs a prediction to detect a next value in the sensor data from a given sensor, for example, based on prior values from the same sensor, or additional sensor data from one or more neighboring sensors.

In addition, the multi-sensor sensor data 310 is applied to an exemplary gateway sensor data compression system 320. The exemplary gateway sensor data compression system 320 comprises multi-sensor image-based compression 330 and/or multi-sensor image-based temporal compression 340 to generate compressed sensor data 350.

The multi-sensor image-based compression 330 recognizes that, in some embodiments, the sensor data 310 from multiple sensors can be viewed as an image. A digital charge-coupled device (CCD) camera, for example, can be viewed as a matrix of sensors. In a similar manner, the multi-sensor sensor data 310 from multiple sensors 210 at the gateway 120, can be expected to provide a result that is smooth (for example, humidity or temperature). Thus, the exemplary multi-sensor image-based compression 330 leverages available image-based compression techniques, such as a discrete cosine transform technique (DCT (e.g., JPEG)), or another compression algorithm that is substantially optimized for continuous maps in order to get improved compression at the gateway 120. DCT-based compression algorithms leverage the fact that points that are close to each other usually have similar values (e.g., the frequencies tend to be low). Since, in many cases, close accuracy of the sensor data will be sufficient, DCT-type compression algorithms achieve significantly higher compression ratios, without a significant loss of accuracy.

Thus, the exemplary multi-sensor image-based compression 330, in some embodiments, receives sensor data from multiple sensors that satisfy one or more neighboring criteria. The sensor data from multiple neighboring sensors can be compressed with improved performance. The multi-sensor sensor data 310 is optionally normalized prior to being applied to the DCT-type compression algorithm.

As shown in FIG. 3, multi-sensor image-based temporal compression 340 is also optionally applied to the multi-sensor sensor data 310. Generally, the exemplary multi-sensor image-based temporal compression 340 looks at the multi-sensor "image" over time as video-like data. Thus, the exemplary multi-sensor image-based temporal compression 340 optionally applies one or more video-based compression algorithms to the multi-sensor sensor data 310 to achieve improved compression. In some embodiments, the multi-sensor image-based temporal compression 340 effectively leverages knowledge from a previous time frame to predict the current state of the sensors 210 to achieve improved compression ratios.

In some embodiments, additional environmental knowledge 315 may be available to the multi-sensor image-based compression 330 and/or the multi-sensor image-based temporal compression 340 to further improve the compression. For example, the gateway 120, a predefined source of information or another portion of the system may know of global changes that may occur and affect the sensor measurements. Thus, the additional environmental knowledge 315 provides a mechanism to leverage the global changes in the prediction algorithms performed by the multi-sensor image-based compression 330 and/or the multi-sensor image-based temporal compression 340 to improve the predictions and achieve higher accuracy and better data compression.

For example, the gateway 120 may know that the watering system of an agricultural environment will be turned on and thus humidity values will change. This additional environmental knowledge 315 can be used as metadata for the models employed by the multi-sensor image-based compression 330 or multi-sensor image-based temporal compression 340, for example, as the additional environmental knowledge 315 identifies which locations of the field will get water and when. Another example is a weather forecast, such as a rain forecast, can also provide additional environmental knowledge 315 about expected humidity that can be integrated into the model(s).

The gateway 120 often has knowledge from multiple sensors 210. The gateway 120 can use this knowledge to predict a future output of one or more sensors 210. In one or more embodiments, the sensor data compression system 300 may provide a future sensor data prediction feedback 360 from the gateway sensor data compression system 320 to one or more of the sensors 210 or the single sensor prediction-based compressors 305. In this manner, a predicted parameter can be propagated from the gateway 120 to the sensor 210, for example, thereby allowing the sensor 210 to produce a better prediction for future results, often with less bandwidth than sending the actual results. It is noted that the link from gateway devices 120 to sensors 110 is often less utilized than the link in the other direction. Thus, this link 360 can be used in one or more embodiments to send prediction hints, for example, to the single sensor prediction-based compressors 305, or compression algorithms on the sensors 110 themselves, to improve the compression.

While the exemplary embodiment of FIG. 3 illustrates the multi-sensor image-based compression 330 and the multi-sensor image-based temporal compression 340 as distinct units, the functionality described herein for the multi-sensor image-based compression 330 and the multi-sensor image-based temporal compression 340 can be implemented as a single functional unit, as would be apparent to a person of ordinary skill in the art.

Figure 4:
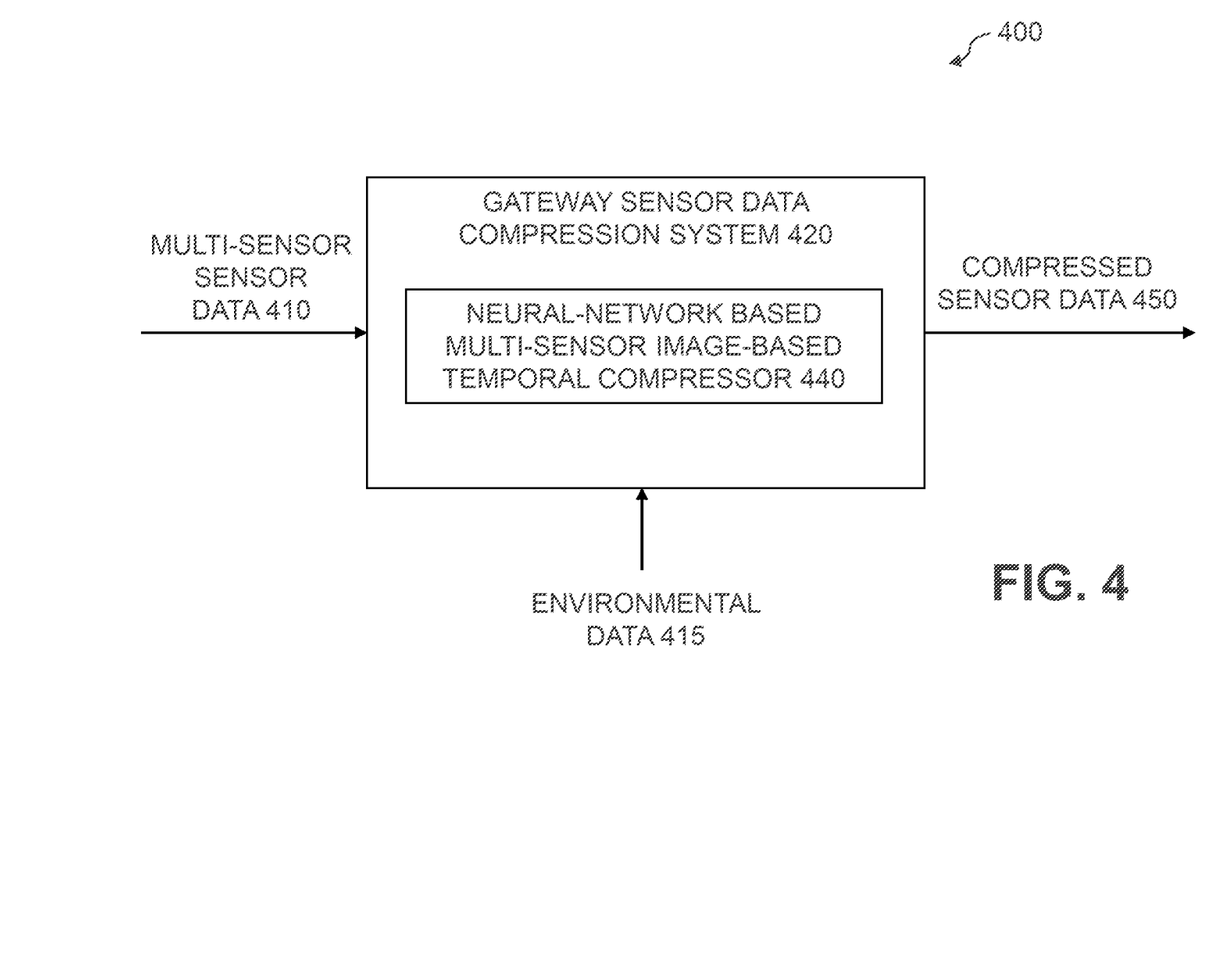
FIG. 4 illustrates an alternative sensor data compression system for a multi-sensor IoT environment, according to one embodiment.

FIG. 4 illustrates an alternative exemplary sensor data compression system 400 for a multi-sensor IoT environment, according to one embodiment. Generally, the exemplary sensor data compression system 400 processes multi-sensor sensor data 410, in a similar manner as the sensor data compression system 300 of FIG. 3.

As shown in FIG. 4, the exemplary sensor data compression system 400 comprises a gateway sensor data compression system 420 which further comprises a neural-network based multi-sensor image-based temporal compressor 440 to generate compressed sensor data 450.

Generally, the neural-network based multi-sensor image-based temporal compressor 440 employs auto-encoder deep learning techniques, such as those described in Cedric Yue Sik Kin and Berk Coker, "Video Compression Using Recurrent Convolutional Neural Networks," (2017), that employ one or more over-fitted bidirectional recurrent convolutional neural networks to compress the sensor data obtained over time.

Generally, one or more aspects of the disclosure recognize that such deep learning techniques can be employed to achieve improved video compression algorithms.

In some embodiments, the disclosed multi-sensor sensor data compression techniques process sensor data from sensors satisfying predefined sensor similarity criteria and/or predefined sensor proximity criteria to improve the compression of sensor readings from multiple sensors. The exemplary predefined sensor similarity criteria and/or predefined sensor proximity criteria can be specified as part of an exemplary sensor data policy.

In some embodiments, predefined similar sensor type rule(s) can specify that the multiple sensors have a predefined substantially similar sensor type. In at least one embodiment, the similar sensor type rule(s) are employed to specify when two sensors are of a sufficiently similar type to allow the sensor data of one sensor to be compressed with sensor data of another sensor. For example, the similar sensor type rule(s) can specify that a first sensor comprises a first predefined sensor type and that one or more additional sensors comprise one or more additional predefined sensor types. It is noted that the similar sensor type rule(s) do not need to require that the sensors are of the same type. The similar sensor type rule(s) may require that the sensors measure comparable information. For example, an infrared camera can estimate temperatures and verify whether thermostat sensors are taking accurate temperature measurements.

In some embodiments, predefined proximate sensor rule(s) can specify that the multiple sensors have a predefined substantially similar sensor location. For example, the proximate sensor rule(s) can specify that the multiple sensors surround a first sensor and satisfy predefined neighboring criteria. In at least one embodiment, the proximate sensor type rule(s) are employed to specify when two sensors are sufficiently close to allow mutual data compression in accordance with the disclosed data compression techniques.

One or more aspects of the disclosure recognize that sensors of the same or similar sensor type, located at the same or similar geo-location, at the same time or a similar time, will often measure substantially the same value. Thus, the similar sensor type rule(s) and the proximate sensor rule(s) can optionally be combined, for example, to compress sensor data from sensors of similar sensor types located at similar geo-locations (and optionally at the same time or a similar time). Multiple thermostats, for example, will measure temperatures that should be very similar in close locations (unless, of course, one of the sensors had a reason for the temperature change).

In some embodiments, predefined environmental knowledge sensor rule(s) can specify one or more external sources of environmental information or environmental data 415 that can be used to validate and/or correct sensor readings. For example, a humidity value can be measured by an IoT humidity sensor (e.g., a humidistat sensor) at a particular location, which can be compared to an estimated humidity value for the particular location obtained, for example, from a weather forecast or another predefined data source.

In one or more embodiments, the sensor data compression algorithms will have generic APIs for specifying one or more of the similar sensor type rule(s); proximate sensor rule(s); and/or environmental knowledge sensor rule(s).

Figure 5:
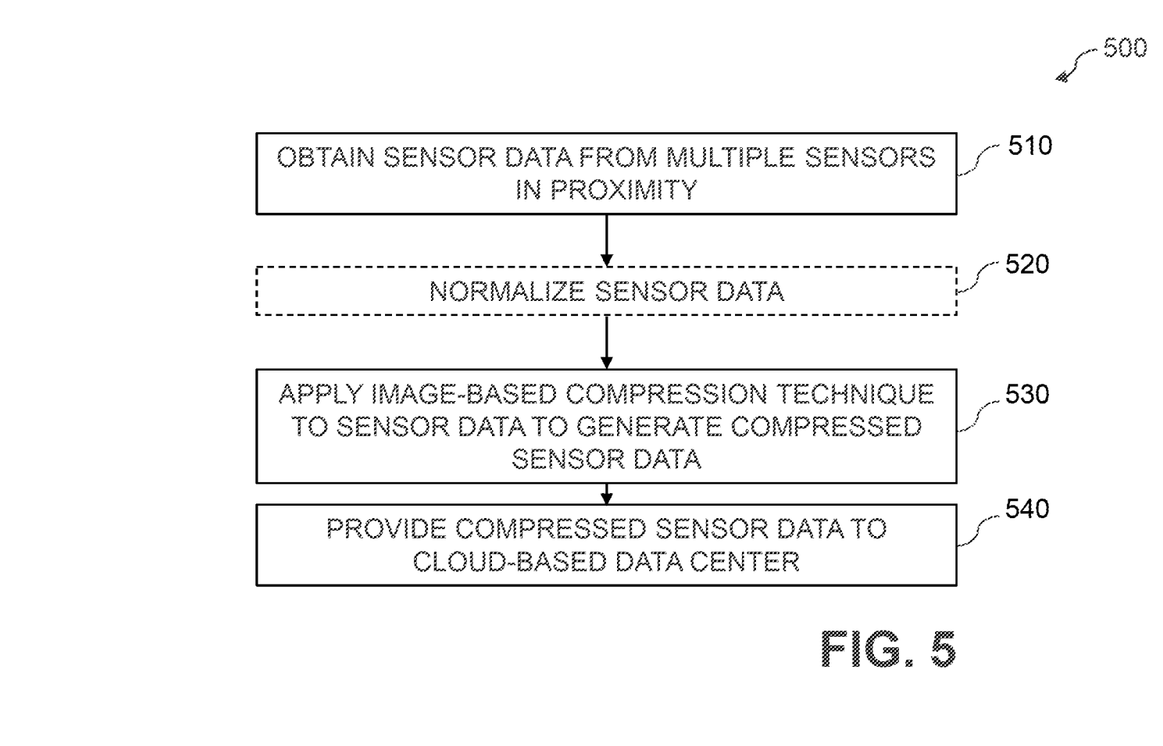
FIG. 5 is a flow chart illustrating a multi-sensor data compression process, according to an embodiment of the disclosure.

FIG. 5 is a flow chart illustrating a multi-sensor data compression process 500, according to an embodiment of the disclosure. The exemplary multi-sensor data compression process 500 is implemented by a given IoT component in the IoT system 100 of FIG. 1 (e.g., the techniques can be applied at any level, such as for multiple sensors within an area, or by gateways, concentrators, hubs or other aggregation devices of the same type, or a different type). As shown in FIG. 5, during step 510, the exemplary multi-sensor data compression process 500 initially obtains sensor data from multiple sensors (e.g., in proximity to one another). During step 520, the multi-sensor data compression process 500 optionally normalizes the obtained sensor data.

The exemplary multi-sensor data compression process 500 then applies an image-based compression technique to the obtained sensor data to generate compressed sensor data. As described above, the image-based compression technique applied during step 530 may comprise, for example, a discrete cosine transform technique, a video compression technique, and/or an auto-encoder deep learning technique. In addition, single sensor prediction-based compression 305 is optionally applied as well, to perform a prediction to detect a next value in the sensor data from a given sensor, for example, based on prior values from the same sensor, or additional sensor data from one or more neighboring sensors.

Finally, during step 540, the exemplary multi-sensor data compression process 500 provides the compressed sensor data to a cloud-based data center, for example.

For a more detailed discussion of suitable techniques for using rules and policies and propagating the rules and policies throughout the IoT system 100, see, for example, U.S. patent application Ser. No. 15/959,592, filed Apr. 23, 2018, entitled "Data Management Policies for Internet of Things Components," incorporated by reference herein in its entirety.

One or more embodiments of the disclosed sensor data compression techniques compress sensor data from multiple sensors that satisfy one or more of sensor similarity, spatial and/or temporal criteria using image-based compression techniques.

One or more embodiments of the disclosure provide improved methods, apparatus and computer program products for sensor data compression for various components of an IoT system. The foregoing applications and associated embodiments should be considered as illustrative only, and numerous other embodiments can be configured using the techniques disclosed herein, in a wide variety of different applications.

It should also be understood that the disclosed techniques for sensor data compression, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for implementing sensor data compression for various components of an IoT system may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a sensor data compression engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a sensor data compression platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
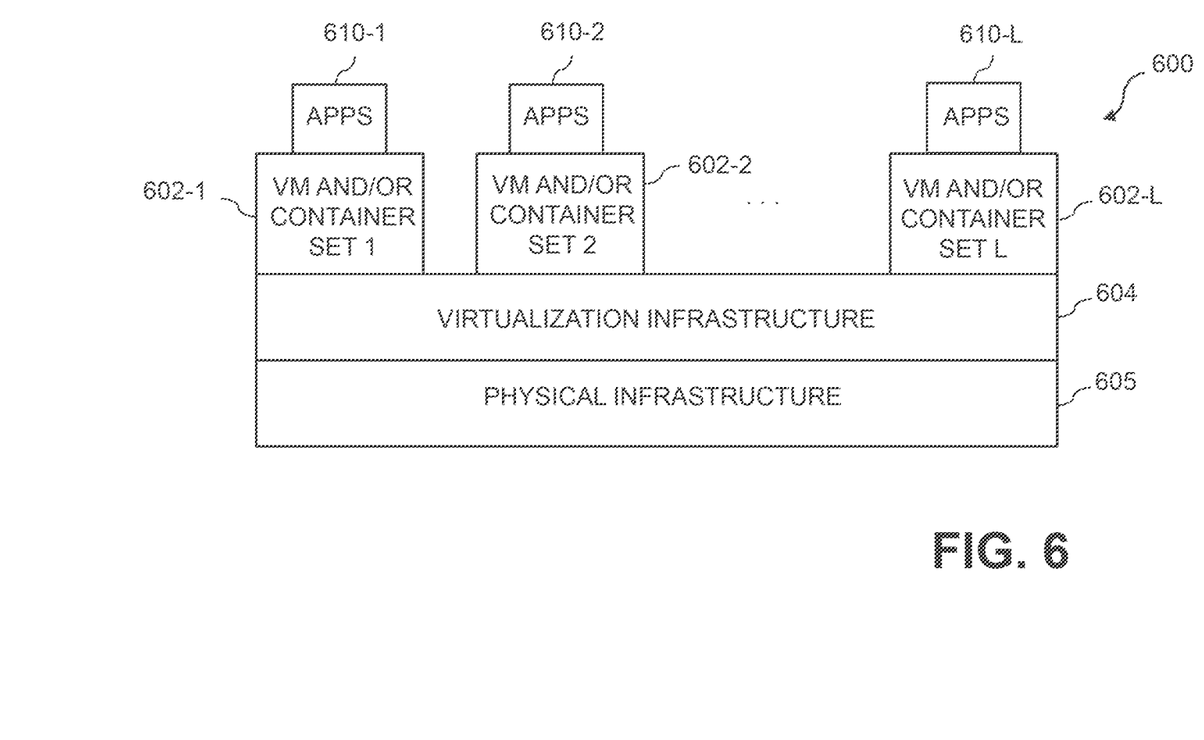
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the disclosed sensor data compression system. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide sensor data compression functionality of the type described above for one or more processes running on a given one of the VMs. For example, each of the VMs can implement sensor data compression control logic and associated sensor data compression functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide sensor data compression functionality of the type described above for one or more processes running on different ones of the containers. For example, a container host device supporting multiple containers of one or more container sets can implement one or more instances of sensor data compression control logic and functions.

As is apparent from the above, one or more of the processing modules or other components of the disclosed sensor data compression system may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
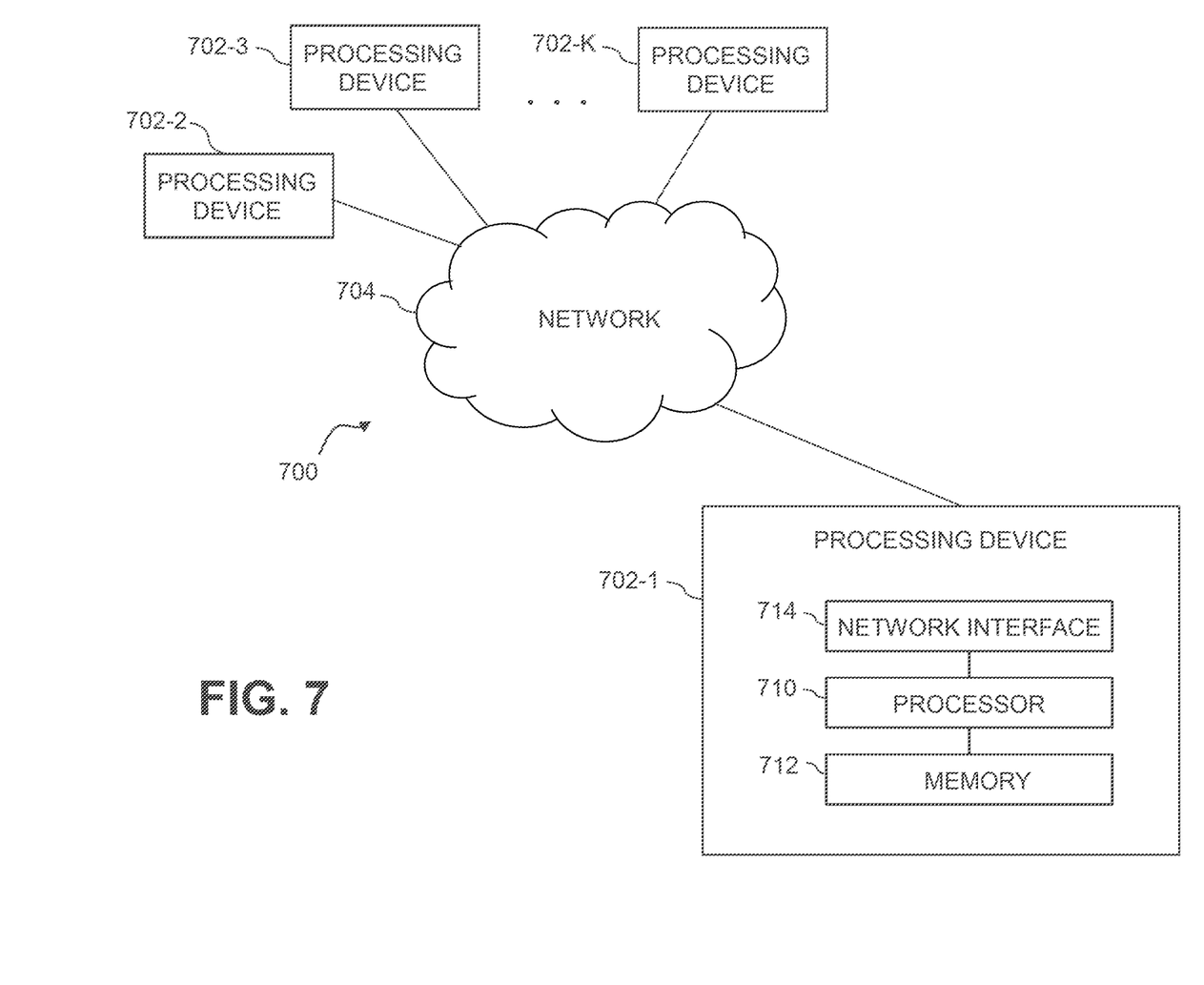
FIG. 7 illustrates another exemplary processing platform that may be used to implement at least a portion of one or more embodiments of the disclosure.

Multiple elements of system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining non-image sensor data from a plurality of sensors;
   applying, by at least one edge-based processing device, an image-based compression technique to the non-image sensor data to generate compressed sensor data responsive to the plurality of sensors satisfying one or more predefined sensor proximity criteria based on a distance between the plurality of sensors; and
   providing, by the at least one edge-based processing device, the compressed sensor data to a data center.

2. The method of claim 1, wherein the non-image sensor data from one or more of the plurality of sensors comprises non-image sensor data compressed using a prediction-based single sensor compression technique.

3. The method of claim 1, further comprising predicting, using the at least one edge-based processing device, a future value of the non-image sensor data from one or more of the plurality of sensors and providing the predicted future value of the non-image sensor data to the one or more sensors.

4. The method of claim 1, wherein the image-based compression technique comprises a discrete cosine transform technique, and further comprising normalizing the non-image sensor data prior to the applying step.

5. The method of claim 1, wherein the non-image sensor data is obtained over time and wherein the image-based compression technique comprises a video compression technique.

6. The method of claim 1, wherein the image-based compression technique employs an auto-encoder deep learning technique that utilizes one or more over-fitted bidirectional recurrent convolutional neural networks to compress the non-image sensor data obtained over time.

7. The method of claim 1, wherein the plurality of sensors has a substantially similar sensor type and a substantially similar sensor location.

8. The method of claim 1, further comprising estimating a value of the non-image sensor data from one or more of the plurality of sensors based on a predefined source of environmental information.

9. A system, comprising:
   a memory; and
   at least one processing device, coupled to the memory, operative to implement the following steps:
   obtaining non-image sensor data from a plurality of sensors;
   applying, by at least one edge-based processing device, an image-based compression technique to the non-image sensor data to generate compressed sensor data responsive to the plurality of sensors satisfying one or more predefined sensor proximity criteria based on a distance between the plurality of sensors; and
   providing, by the at least one edge-based device, the compressed sensor data to a data center.

10. The system of claim 9, wherein the non-image sensor data from one or more of the plurality of sensors comprises non-image sensor data compressed using a prediction-based single sensor compression technique.

11. The system of claim 9, further comprising predicting, by the at least one edge-based device, a future value of the non-image sensor data from one or more of the plurality of sensors and providing the predicted future value of the non-image sensor data to the one or more sensors.

12. The system of claim 9, wherein the image-based compression technique comprises a discrete cosine transform technique, and further comprising normalizing the non-image sensor data prior to the applying step.

13. The system of claim 9, wherein the non-image sensor data is obtained over time and wherein the image-based compression technique comprises a video compression technique.

14. The system of claim 9, wherein the image-based compression technique employs an auto-encoder deep learning technique that utilizes one or more over-fitted bidirectional recurrent convolutional neural networks to compress the non-image sensor data obtained over time.

15. A computer program product, comprising a non-transitory machine-readable storage medium having encoded therein executable code of one or more software programs, wherein the one or more software programs when executed by at least one processing device perform the following steps:

obtaining non-image sensor data from a plurality of sensors;

applying, by at least one edge-based processing device, an image-based compression technique to the non-image sensor data to generate compressed sensor data responsive to the plurality of sensors satisfying one or more predefined sensor proximity criteria based on a distance between the plurality of sensors; and providing, by the at least one edge-based device, the compressed sensor data to a data center.

16. The computer program product of claim 15, wherein the non-image sensor data from one or more of the plurality of sensors comprises non-image sensor data compressed using a prediction-based single sensor compression technique.

17. The computer program product of claim 15, further comprising predicting, by the at least one edge-based device, a future value of the non-image sensor data from one or more of the plurality of sensors and providing the predicted future value of the non-image sensor data to the one or more sensors.

18. The computer program product of claim 15, wherein the image-based compression technique comprises a discrete cosine transform technique, and further comprising normalizing the non-image sensor data prior to the applying step.

19. The computer program product of claim 15, wherein the non-image sensor data is obtained over time and wherein the image-based compression technique comprises a video compression technique.

20. The computer program product of claim 15, wherein the image-based compression technique employs an auto-encoder deep learning technique that utilizes one or more over-fitted bidirectional recurrent convolutional neural networks to compress the non-image sensor data obtained over time.

* * * * *